July 14, 1970     U. O. GRAHAM ET AL     3,520,391
INTERMITTENT DRIVEN MECHANISM
Filed Jan. 29, 1968     2 Sheets-Sheet 1
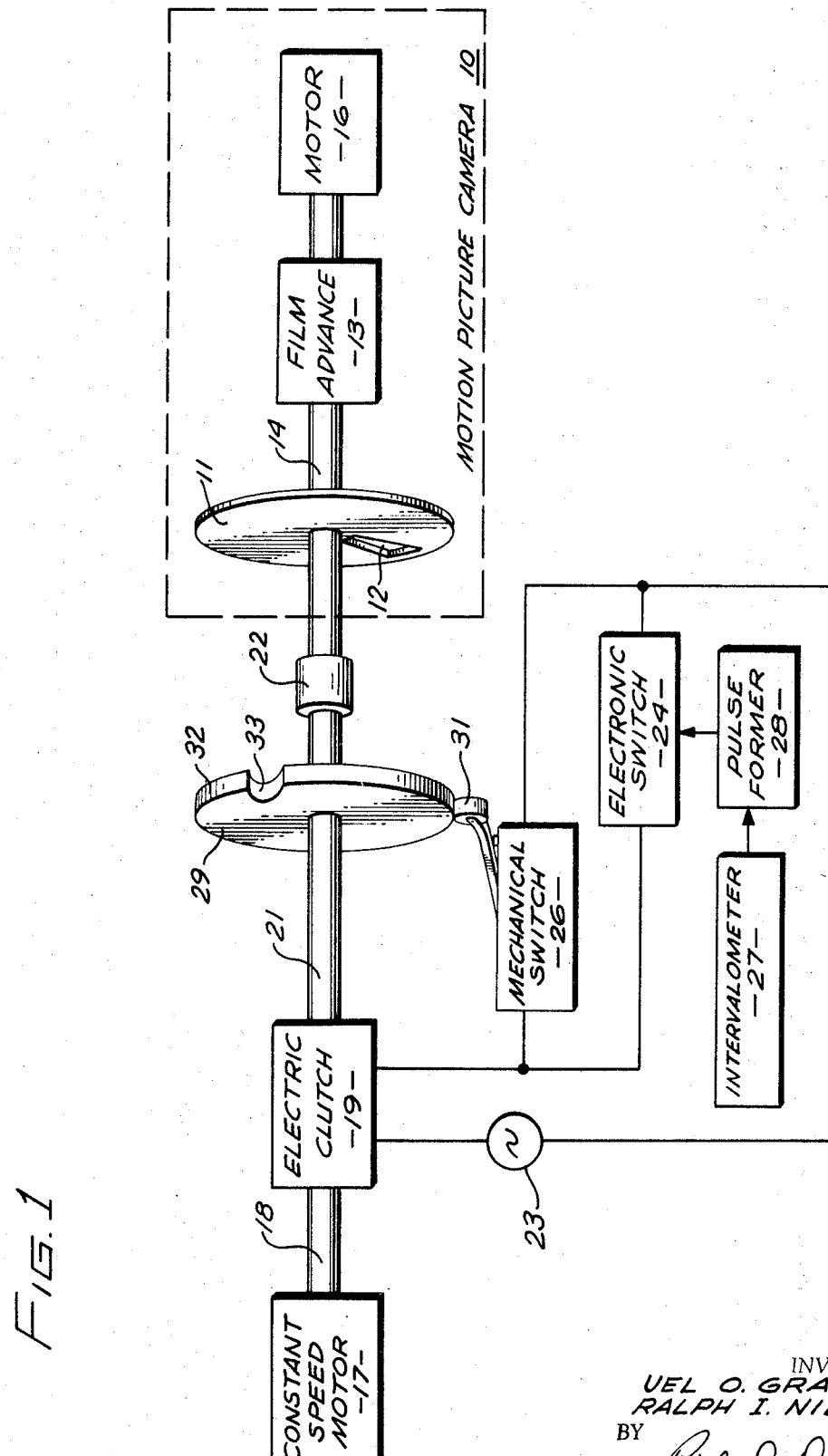
INVENTORS.
UEL O. GRAHAM
RALPH I. NIELSEN
BY
*Richard D. Seibel*
ATTORNEY

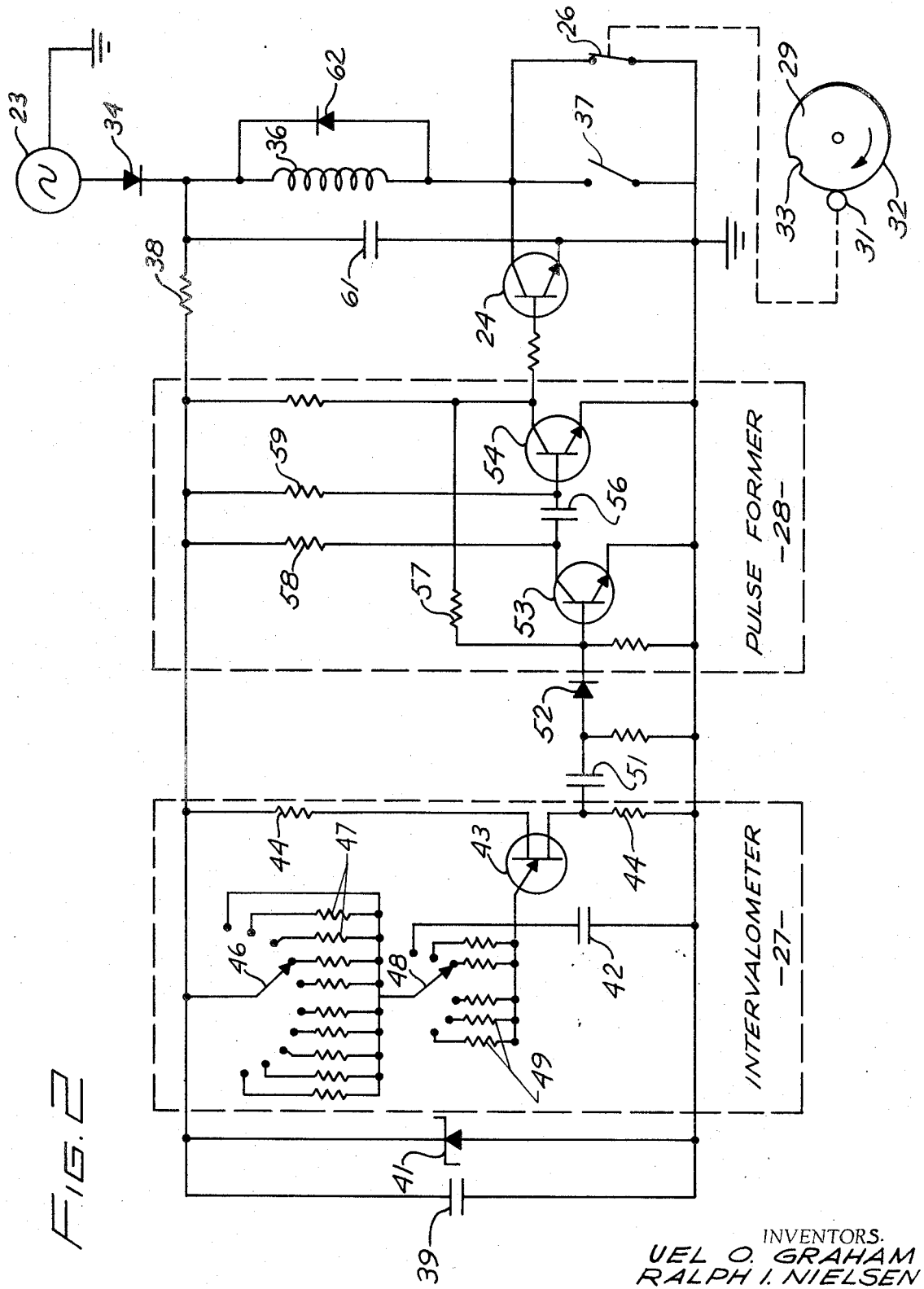

United States Patent Office 3,520,391
Patented July 14, 1970

3,520,391
INTERMITTENT DRIVE MECHANISM
Uel O. Graham, West Covina, and Ralph I. Nielsen, Huntington Beach, Calif., assignors to North American Rockwell Corporation
Filed Jan. 29, 1968, Ser. No. 701,450
Int. Cl. F16d 71/00
U.S. Cl. 192—142                    3 Claims

ABSTRACT OF THE DISCLOSURE

An intermittent drive mechanism having a constant speed motor and an electric clutch is described particularly for attachment to a rotary shutter camera for time lapse photography. An intervalometer provides timing signals at selectively variable repetitive time intervals for initially energizing the electric clutch by way of a pulse former and electronic switch. Energization of the clutch causes rotation of an output shaft and the operating mechanisms of the camera including the shutter. A cam on the output shaft is also rotated and operates a mechanical switch to close a circuit path in parallel with the electronic switch. After sufficient time has elapsed for the mechanical switch to be closed, the pulse from the pulse former to the electronic switch terminates and opens this circuit path. The mechanical switch then sustains energization of the clutch until sufficient angular rotation of the cam brings a cam detent into position for opening the switch which in turn, deenergizes the clutch and stops rotation of the output shaft and shutter at the completion of one full cycle. Electronic circuits are shown for the intervalometer and pulse former.

BACKGROUND

Many industrial and commercial organizations have motion picture cameras for use in day to day operations. Many of these are high speed cameras for obtaining "slow motion" pictures of rapidly transpiring events. It quite often occurs that these high speed cameras, and the more usual frame rate cameras, are employed on an occasional basis and are available for other utilization. In these same industrial and commercial environments it is often found that time lapse motion picture photography is desirable for "compressing" time and providing a continuous record of events occurring over long time intervals without excessive use of film. Time lapse photography involves exposing individual frames of motion picture film at normal shutter speeds, and with a relatively long interval between successive frames as compared with a usual frame rate of about 24 frames per second. Thus, for example, it may be desirable to provide long term monitoring of areas by time lapse cameras to deter or detect crime. Similarly, time lapse photography is particularly useful for monitoring pedestrian and vehicular traffic pattern. The uses of time lapse photography in nature studies and animation are also well known.

Special time lapse cameras have been employed in the past for this type of work, however, in many instances, this entails purchase of additional photographic equipment so that multiple cameras are employed for the diverse tasks encountered in industry and commerce. The conversion of conventional motion picture cameras to time lapse photography is usually expensive and time consuming. Attachments for conventional motion picture cameras, particularly for intermittently used high speed cameras, have not been available in the past.

It is therefore desirable to provide a temporary attachment for conventional motion picture cameras for temporarily converting the camera for time lapse photography without diminishing the utility of the camera for more common motion picture work. An attachment of this sort is preferably provided with a selectively variable time interval for determining the frame rate of the photography and the attachment should operate with a minimal noise level particularly for security and nature work. The attachment should also be small and light weight, inexpensive and preferably reversible.

SUMMARY OF THE INVENTION

Thus in the practice of this invention according to a preferred embodiment, there is provided an intermittent drive mechanism having a drive motor and a rotatable output shaft with an electrically operated clutch operatively interconnecting the motor and the output shaft. An electronic switch momentarily closes a circuit that enrgizes the clutch for engagement thereof at selectively variable time intervals. A mechanical switch controls another circuit that sustains energization of the clutch after the initial energizing by the electronic switch has terminated. A cam on the output shaft operates the mechanical switch in response to rotation of the shaft for energizing the clutch only for a selected angular rotation of the shaft. The intermittent drive mechanism in a preferred embodiment is temporarily combined with a motion picture camera for operating the shutter thereof at selectively variable time intervals for adapting a conventional motion picture camera for time lapse photography.

Many of the attendant advantages of this invention will be readily appreciated as the same becomes better understood by reference to the following detailed description when considered in connection with the accompanying drawing wherein:

FIG. 1 illustrates semischematically a block diagram of an intermittent drive mechanism and a camera; and FIG. 2 illustrates a circuit diagram for the intermittent drive mechanism.

Throughout the drawings, like numerals refer to like parts.

An intermittent drive mechanism as illustrated in the preferred embodiment of FIG. 1, is particularly useful in conjunction with a conventional motion picture camera 10, however, it will be apparent to one skilled in the art that intermittent drive mechanisms have many other applications.

In a typical motion picture camera 10, particularly high speed cameras, a rotating shutter 11 is employed for exposure. This shutter comprises an opaque disk 11 having a transparent slit 12 therethrough and the exposure time is determined by the speed of rotation of the shutter and the included angle of the transparent slit 12. Thus, for example, a shutter having a 7½-degree slit rotating at one revolution per second provides an exposure time or shutter speed of ⅟₄₈ second which is sufficient to "stop" most motion of interest in time lapse photography. Connected to the shutter 11 is a conventional film advance mechanism 13 which, for purposes of illustration in FIG. 1, is shown schematically on the same rotatable shaft 14 as the shutter 11. It will be apparent that any suitable mechanical connection can be employed for synchronizing operation of the shutter and the film advance mechanism. Also illustrated schematically in FIG. 1 on the same camera shaft 14 is a conventional camera drive electric motor 16 for operating both the shutter and the film advance mechanism. It will be apparent that many conventional mechanical and optical elements of the motion picture camera 10 are omitted from the drawing of FIG. 1 since, although necessary for operation of a camera, they are not of significance in understanding of this invention.

In addition to the conventional motion picture camera

10, FIG. 1 also illustrates an intermittent drive mechanism incorporating the principles of this invention. As illustrated in this embodiment there is provided a continuously rotating constant speed electric motor 17 providing power to a driving shaft 18. The motor output shaft 18 also serves as an input shaft to a conventional electric clutch conventionally provides a positive driving connection or engagement between the clutch input shaft 18 and its output shaft 21 when energized by an electric current. The input and output shafts are disconnected or disengaged in the absence of an energizing current and conventional electric clutches are often provided with a brake (not shown) which stops the output shaft 21 when the clutch is de-energized and disengaged. Constant speed synchronous "clock" motors with a built-in solenoid operated electric clutch are readily and inexpensively available in a wide variety of rotational speeds and torque outputs. The electric clutch is conventionally of simple manufacture, relatively high reliability, light weight, nearly silent, and very inexpensive.

In use, the output shaft 21 of the electric clutch 19 is temporarily connected to the camera shaft 14 by a conventional coupling 22. Thus, upon engagement of the electric clutch 19, the output shaft 21 and the camera shaft 14 rotate together thereby operating the shutter 11 and film advance mechanism 13 of the motion picture camera 10. The camera motor 16 is also rotated in operation of the time lapse attachment. No difficulty has been encountered in forcing relatively slow rotation of high speed electric camera motors and this enables use of the time lapse attachment on conventional motion picture cameras without disabling them for more conventional service. In the illustrated embodiment the converse is not necessarily true and the time lapse attachment is preferably removed before operation of motion picture camera in its conventional mode because of the inherent braking action of the electric clutch. If desired, however, it will be apparent to one skilled in the art that the fixed coupling 22 can be replaced with a unidirectional clutch or other quick disconnect means so that the attachment can be permanently affixed to the motion picture camera body and placed into alternative use only when desired. Similarly, a clutch 19 without built-in braking action can be employed.

Energization of the electric clutch 19 is provided by a conventional power supply 23 by way of two parallel paths comprising an electronic switch 24 and a mechanical switch 26. An intervalometer 27 or timing signal generator provides short signal pulses with selectively variable time intervals therebetween. The signal pulse from the intervalometer is applied to a pulse former 28 which generates a pulse of sufficient time duration for energizing the electric clutch 19 until the mechanical switch 26 is actuated as hereinafter described. The pulse from the pulse former 28 is applied to the electronic switch 24 for energizing the electric clutch.

A cam 29 is provided on the clutch output shaft 21 for rotation therewith and for actuation of the mechanical switch 26 by way of a cam follower 31. In a preferred embodiment the cam 29 comprises a circular disk, the outer periphery of which forms a first camming surface 32 and which includes a detent or cutout portion 33 forming a second camming surface. The mechanical switch 26 is preferably a normally-open switch so that when the cam follower 31 is in the detent 33, when the electric clutch is in its inactive position, the switch 26 is open. Likewise, when the cam 29 is rotated so that the cam follower 31 is in engagement with the first peripheral camming surface 32 of the cam the mechanical switch 26 is closed and an energizing current is provided to the electric clutch 19 for engagement thereof.

The cycle of operation of the intermittent drive mechanism is thus initiated by a time signal from the intervalometer 27, which signal is formed into a longer pulse by the pulse former 28. This switches the electronic switch 24 for initially energizing the electric clutch 19. Engaging of the clutch 19 connects its output shaft 21 with the output shaft 18 of the constant speed motor 17, thereby rotating the shaft 21 and the drive shaft 14 of the camera. The cam 29 also rotates and the cam follower 31 leaves the detent 33 and rides on the peripheral camming surface 32. This closes the mechanical switch 26 which is in parallel with the electronic switch 24. After the mechanical switch is closed the pulse from the pulse former 28 terminates thereby "opening" the electronic switch 24. Because of the parallel path provided by the mechanical switch 26 the energization of the clutch 19 is sustained.

After the shaft 21, and hence the shutter 11, has rotated a full revolution, the cam 29, which is rotating therewith, reaches a position where the cam follower 31 again engages the detent 33 and the mechanical switch 26 is opened thereby deactivating the electric clutch and causing the output shaft 21 to stop until the next start signal is generated by the intervalometer. The single full revolution of the camera shaft 14 provides one frame of photography by the camera in the normal type of operation. It will be apparent that if, in a selected motion picture camera, the frame rate is greater than one frame per revolution of the shaft 14, that additional detents are provided on the cam 29 for providing rotation through any selected angular amount for providing a full operating cycle of frame exposure and film advance for the motion picture camera.

FIG. 2 illustrates a circuit diagram for a preferred electrical arrangement for energizing the electric clutch. As illustrated in this embodiment the power supply 23 is half wave rectified by a diode 34 and this voltage is applied to one side of the coil 36 of the electric clutch 19 (not shown in FIG. 2). The other side of the coil 36 is connected to ground through parallel paths including the electronic switch or transistor 24, the mechanical switch 26, and a manual film advance switch 37. Thus to energize the clutch coil 36 either the transistor 24 can conduct, the mechanical switch 26 can close, or the manual switch 37 can close.

Power for the intervalometer 27 and pulse former 28 are provided by way of a dropping resistor 38 and the voltage is stabilized by a capacitor 39 and a Zener diode 41 in a conventional manner. It will be apparent to one skilled in the art that this power supply voltage could also be supplied by a transformer arrangement or by batteries.

The intervalometer comprises a free running relaxation oscillator wherein a capacitor 42 is charged to a level sufficient to fire a unijunction transistor 43 appropriately biased by resistors 44. The time constant of the relaxation oscillator and therefore the interval between the repeated timing signals is determined by the resistance through which the capacitor 42 is charged. As soon as capacitor 42 is discharged by way of unijunction transistor 43, recharging commences and a repeated "start" signal is generated. In order to provide selectively variable time intervals between start signals a plurality of resistors of different values are employed in series with the capacitor 42. In a preferred embodiment a multiple pole switch 46 is employed to select any of ten resistive paths 47 each of which gives a different time constant with one second steps between resistive paths. In series with the resistors 47 is a second multiple pole switch 48 for selecting between any of six resistive paths 49 which vary the time constant of the relaxation oscillator in ten second steps.

Thus by selecting appropriate resistors in the parallel net 47 and the parallel net 49 in series therewith, any time constant from one second up to 59 seconds in one second steps is obtained. That is, signal pulses are obtained from the intervalometer with a time interval therebetween selected from 1, 2, 3, 4 . . . 59 seconds. It will be readily apparent that in other applications a single set of selectable resistors can be employed rather than the decade arrangement described or that greater or lesser numbers of resistors can be employed as desired for any number of selected time intervals. Similarly a variable resistor can be used to provide "infinite" variation of time constant. Instead of an analog circuit it will be apparent that a digital intervalometer can also be employed if preferred.

The timing signal generator or intervalometer 27 accordingly produces a selectively timed output from unijunction transistor 43 that is coupled to the pulse former 28 by a capacitor 51 and diode 52 in a conventional manner. The pulse former 28 illustrated in FIG. 2 comprises a monostable multivibrator having a pair of cross coupled transistors 53, 54. The input signal from the intervalometer is applied to the base of NPN transistor 53 of which the collector is connected to the base of the second NPN transistor 54 by way of a capacitor 56. The collector of transistor 54 is feedback connected to the base of transistor 57. A pair of dissimilar resistors 58 and 59 connect opposite sides of capacitor 56 to the power supply for recharging thereof.

A signal from the intervalometer causes transistor 53 to conduct thereby discharging capacitor 56 and causing transistor 54 to also conduct. This conduction continues, assuring a brief but sufficiently sustained output pulse, until capacitor 56 recharges in a time interval determined by the relative values of resistors 58 and 59 and capacitor 56. When the capacitor is sufficiently charged, transistor 54 no longer conducts and the pulse is terminated.

The output pulse from the collector of transistor 54 in the pulse former 28 is resistively coupled to the base of the electronic switch 24 or transistor. This signal causes conduction by the transistor or closing of the switch, hence energization of the coil 36 of the electric clutch.

As hereinabove pointed out the pulse duration from the pulse former and hence closing of the electronic switch 24 is of sufficient time duration for the cam 29 to rotate to a position where the cam follower 31 is raised out of the detent 33 and rises onto the camming surface 32 for closing the mechanical switch 26. This assures that a full cycle of camera operation occurs for each time interval signal from the intervalometer.

A capacitor 61 is connected between the power supply and the emitter of transistor 24 and a diode 62 is connected across the coil 36 of the clutch to minimize transients induced by the coil 36 which would otherwise interfere with proper functioning of the intervalometer and pulse former.

It will be apparent from the above description that the intermittent drive mechanism permits time lapse photography with conventional motion picture cameras without diminishing the utility of the camera for its conventional operation. It should also be noted that merely by using a reversible motor for the time lapse attachment it is possible to operate the camera in reverse which is useful for animation. It is found with the described drive mechanism that substantially silent operation is obtained and cameras hidden for surveillance of areas are not detected by persons in the area.

Obviously, many modifications and variations of the present invention are possible in light of the above teachings. It is therefore to be understood that within the scope of the appended claims the invention may be practiced otherwise than as specifically described.

What is claimed is:
1. An intermittent drive mechanism comprising:
rotating input means;
rotatable output means;
an electric clutch means for operatively interconnecting said input means and said output means;
first switch means for momentarily energizing said clutch means;
second switch means for sustained energizing of said clutch means;
operator means on said output means for operating said second switch means in response to rotation of said output means to effect energization of said clutch means only for a selected angular amount of rotation;
means for actuating said first switch means at selectively variable intervals;
said first switch means including a transistor; and
said means for actuating including intervalometer means for generating signals at selectively variable intervals, and pulse forming means responsive to said intervalometer means for switching said transistor.

2. A drive mechanism as defined in claim 1 wherein said second switch means comprises a mechanically operable switch; and
said operator means comprises a cam on said output means including a first cam surface for closing said mechanically operable switch during a first portion of rotation of said output means and a second cam surface for opening said mechanically operable switch during a second portion of rotation of said output means.

3. A drive mechanism as defined in claim 2 wherein said intervalometer means comprises a relaxation oscillator having a selectively variable time constant; and
said pulse forming means comprises a monostable multivibrator for generating a pulse of sufficient duration for said cam to rotate to a position wherein said first cam surface operates said mechanically operable switch, said pulse being applied to said transistor for switching thereof.

References Cited

UNITED STATES PATENTS

| 1,687,587 | 10/1928 | Pearne et al. | 192—142 |
| 2,066,131 | 12/1936 | White. | |
| 2,683,514 | 7/1954 | Hardway | 192—116.5 |
| 2,878,436 | 3/1959 | Mundt. | |
| 3,044,350 | 7/1962 | Hartnett. | |
| 3,300,012 | 1/1967 | White | 192—142 |
| 3,423,600 | 1/1969 | Pringle | 307—141.4 XR |

ALLAN D. HERRMANN, Primary Examiner

U.S. Cl. X.R.

74—125.5; 192—148; 318—470; 95—53; 352—84